Figure 1:
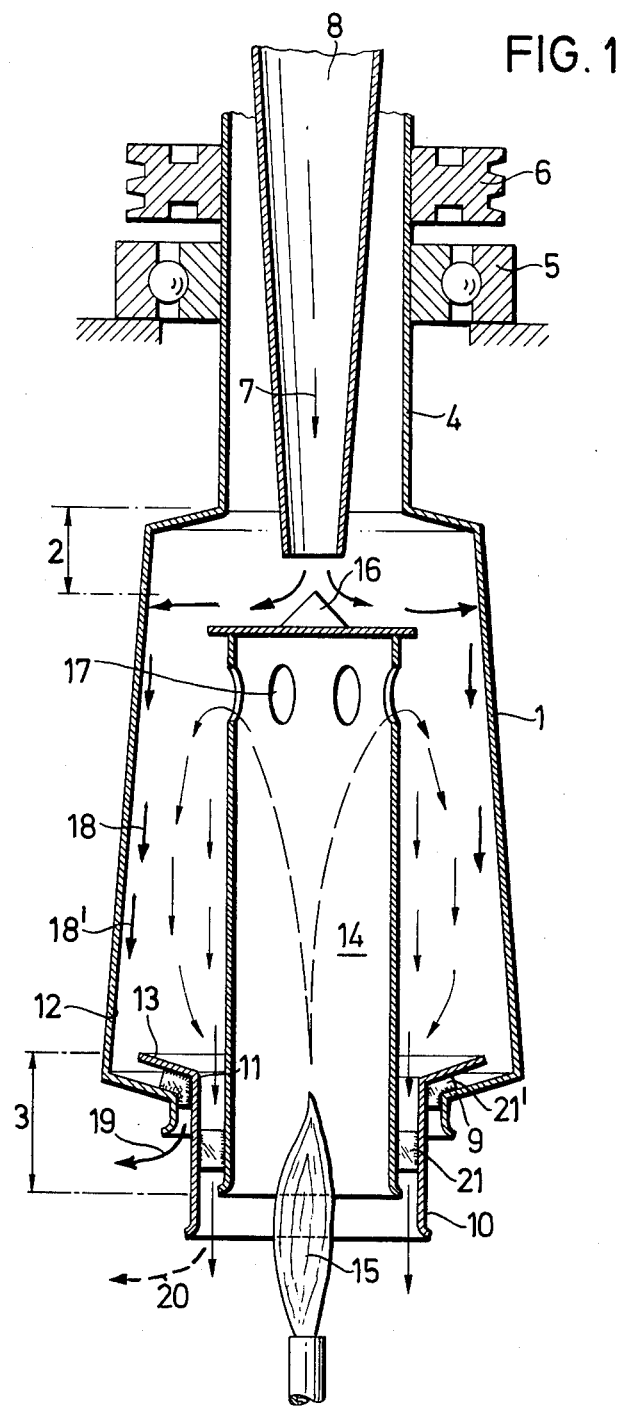

United States Patent [19]

Jakobs et al.

[11] 4,036,480
[45] July 19, 1977

[54] CENTRIFUGAL SEPARATION OF MIXTURES OF AT LEAST PARTIALLY MOLTEN METALS, METAL COMPOUNDS AND/OR METAL-CONTAINING SLAGS INTO INDIVIDUAL CONSTITUENTS

[75] Inventors: Willy Jakobs; Alfred Kryczun, both of Cologne, Germany

[73] Assignee: Klockner-Humboldt-Deutz Aktiengesellschaft, Germany

[21] Appl. No.: 680,775

[22] Filed: Apr. 27, 1976

[30] Foreign Application Priority Data

May 2, 1975   Germany ............................ 2519622

[51] Int. Cl.[2] ............................................. C21C 7/00
[52] U.S. Cl. ..................................... 266/204; 266/227
[58] Field of Search ..................... 75/50, 61, 63, 93 R; 266/201, 204, 213, 227; 233/11

[56] References Cited

U.S. PATENT DOCUMENTS

| 2,355,885 | 8/1944 | Merle | 75/93 R |
| 2,395,286 | 2/1946 | Merle | 75/93 R |

*Primary Examiner*—Gerald A. Dost
*Attorney, Agent, or Firm*—Hill, Gross, Simpson, Van Santen, Steadman, Chiara & Simpson

[57] ABSTRACT

A method and apparatus for centrifugal separation of hot materials such as molten metals and slag including feeding the metal and slag mixture into a rotational separator drum having a center inlet at one end and coaxial outlets at the other end, a burner shell within the center of the drum chamber having radial outlet holes and a burner therein with the flame gases flowing outwardly through the radial outlet holes and over the surface of the material being separated heating the material and the flame gases being conducted out the outlet end for continual circulation.

6 Claims, 2 Drawing Figures

CENTRIFUGAL SEPARATION OF MIXTURES OF AT LEAST PARTIALLY MOLTEN METALS, METAL COMPOUNDS AND/OR METAL-CONTAINING SLAGS INTO INDIVIDUAL CONSTITUENTS

BACKGROUND OF THE INVENTION

The present invention relates to devices for the separation of mixtures of hot materials such as partially molten metals or molten metal compounds and metal mixtures with slag by passing them through a centrifugal separation chamber in a rotary separator drum, and more particularly to an improved method and apparatus for the continual separation of metal slag mixtures which can be used in a continual operating refining process.

Centifugal apparatus for the separation of materials has been known in the art, shown for example, in Ger. Pat. No. 80041 issued Apr. 18, 1894. The utilization of centrifugal drums for the separation of molten metals and metal slag mixtures is basic in principle and can be effective and advantageous, and while attempts have been made to utilize the centrifugal separation principle in the continuous metal smelting industry, difficulties have been encountered which have prevented it from being successful.

It is essential in a continously operating metallurgical plant that the separating stage which is at the end of the complete process must be completely satisfactory and be capable of continual operation, or the entire process will fail. One of the requirements is that the separation device be completely reliable and sturdy and simple in maintenance and repair and can operate under heavy loads with heavy materials in heat environments, and with corrosive materials.

In the separation stages in a continuous metal recovery process, one of the steps has been to heat the separator so that when centifugal separation was used, the centrifugal drum was heated before it was placed into operation substantially to the operating temperature required and was held at that temperature level during operation. Maintaining external parts at a predetermined temperature, created difficulties in that some of the parts were not particularly adapted to high temperature, and it was difficult to maintain drives and bearings, and further this resulted in the consumption of heat energy and required insulation or the encountering of heat losses.

In other operations, oxidation of the metal or metal compounds has to be avoided, and because of the deleterious effect of exposure to air, attempts were made to produce an inert gas zone or a buffering gas environment to protect the surface of the materials from the harmful influence of the cold or of the oxidizing circulating air. The problems have been increased by the fact that good separation of different heavy constituents often requires that the products be subjected to contact with the wall of the centrifugal vessel over a long period of time and that all materials be carried on the centrifuging wall for a relatively uniform time period.

In is accordingly an object of the invention to provide an improved centrifugal separator which is capable of continuous operation in a metallurgical refining system and which avoids disadvantages of the prior art encountered because of cooling of the material during separation and because of exposure of the materials to air with resultant temperature loss or resultant oxidation.

A feature of the invention is to provide a centrifugal drum which rotates about an axis of rotation and wherein a flame conducting pipe is coaxially arranged within the drum extending from the outlet end to the inlet end and wherein the pipe is provided with openings for the outlet of hot flame gases which are directed in continual contact with the material within the drum in a flow path that insures heating of the material and prevents exposure to air. The flame gases are arranged to sweep over the entire surface of the material located in the vessel.

A further feature of the invention provides that the flame conducting pipe or shell is supported so as to rotate with the centrifugal drum and is provided with an end wall opposite the inlet to the centrifugal drum which provides as a distributing and deflecting device for the material being charged into the drum, and the deflected material all engages the wall at the beginning end and is immediately subjected to the sweeping flame gases for its full travel along the length of the interior drum surface. The charging material is accelerated additionally by its engagement with the end distribution wall, and is uniformly directed onto the outer wall of the rotating drum. This insures longer contact with the separating wall of the drum and prevente charging material from disrupting material already on the wall of the drum and being separated. The distributing wall, being part of the flame shell, is heated so that there is no loss in temperature of the entering material.

A further feature of the invention is arrangement at the outlet end of the drum for channeling the flame gases out of the drum for continuous complete circulation therein. At the discharge end, the drum has a circular baffle which extends radially and performs a dual function of regulating the amount of lighter material which flows out of the drum, and also guides the flames radially inwardly to pass out of the drum. The lighter weight slag material and flames fow out through the same passage without interfering with the fuel supply and burner which are centrally located in a coaxial position. Another advantage of the invention lies in an arrangement wherein a mounting is provided which supports the flame shell within the drum and which also supports the conduits for conducting the separated materials from the drum. The supports are in the form of hollow arms which serve as conduits for the separated heavier material leaving the drum and the hollow arms are constructed so as to also conduct flames emerging from the drum so that the flame gases are in contact with the surface of the heavier separated material as it flows away from the drum. The hollow arms extending radially outwardly are positioned so that centrifugal force carries the separated material away and had a ventilating effect on the hot flame gases aiding in the effective circulation through the drum and away from the drum. This arrangement also continues to protect the heavier separated material maintaining it blanketed with hot flame gases and maintaining its temperature.

Other advantages, objects and features, as well as equivalent methods and structures which are intended to be covered herein, will become more apparent with the teaching of the principles of the invention in connection with the disclosure of the preferred embodiments in the specification, claims and drawing, in which:

DRAWINGS

Figure 2:
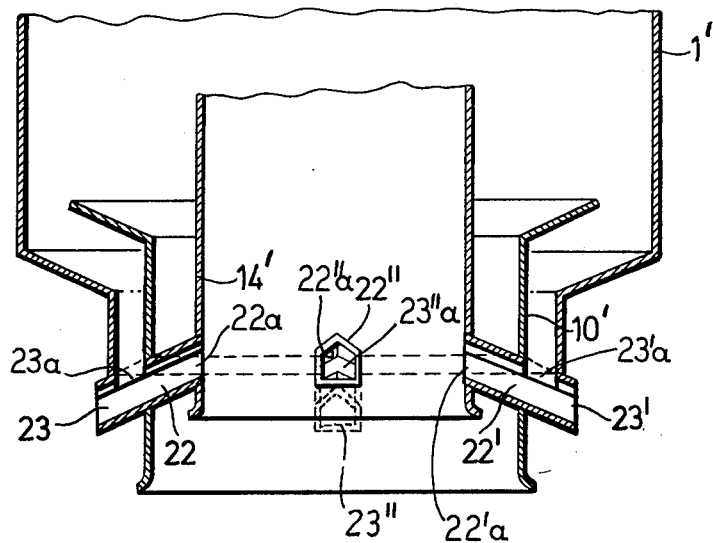

FIG. 1 is a vertical sectional view taken through a separator constructed and operating in accordance with the principles of the present invention; and FIG. 2 is a fragmentary vertical sectional view of a lower end of a separator illustrating a modified structure.

DESCRIPTION

As illustrated in FIG. 1, a centrifugal separator drum 1 is shown having a separation chamber therein. The drum may be operated in various positions, but preferably is operated for rotation about a vertical axis, and is provided with support bearings for mounting the drum for rotation. For this purpose, the drum 1 has an elongate coaxial neck end 4 on which is fitted a pulley 6 to receive belts, not shown, for driving the drum in rotation. The neck end is carried in the inner race of a ball bearing assembly 5 with the outer race being supportively mounted.

The separator is positioned with the hollow neck 14 receiving a supply spout 8 which tapers to a smaller end for supplying a flow of material as indicated by the arrowed line 7. This flow of material may be provided from a continuous operating plant mechanism, such as a metallurgical processing unit having an output such as a hot mixture of metal and slag.

The charging material enters the inlet end through the spout 8 and is thrown outwardly as it enters to the wall 12 of the shell and passes downwardly as indicated by the heavy arrowed lines 18 and 18' toward the outlet end of the drum. At the outlet end, the drum has an inwardly turned flanged end providing a circular opening through the heavier material flows as indicated by the arrowed line 19. The lighter weight separated material flows out through a central ring 10 as indicated by the broken arrowed line 20. Collectors for receiving the separated material may be provided of a nature which will be recognized by those skilled in the art, and such structures as shown for example, in out copending application, Case No. P-76320, Ser. No. 680,673, Filed Apr. 27, 1976.

The ring 10 may be supported by circumferentially separated radial support struts. The arrangement of the ring and outlet will be apparent to those versed in the art from the foregoing description as will modifications thereof, and an arrangement of such structure is shown for example, in German Pat. No. 661,703.

In accordance with the invention, a heating or flame shell 14 is positioned coaxially within the centrifugal separation chamber. This shell 14 is open at its lower end, receives a flame from a burner 15, and has radially outwardly opening ports 17 at its upper end for flow of the flame gases outwardly through the openings and down along the walls in the path indicated by the broken lighter weight arrowed lines. At the upper end of the flame shell is an end wall 16 which may have a conical projection at its center for deflecting and distributing the charging material outwardly as it flows into the chamber. The end wall, of course, will be heated so that contact of the charging material with the end wall will not reduce its temperature, and material will not freeze or cling to the wall. As the flame gases flow along the outer wall while the material is being separated, they completely blanket the material protecting it from engagement with air and oxidation. The flames are channelled inwardly and axially outwardly at the lower end of the separator chamber, and the ring 10 has an outwardly flared collar 13 at its upper edge. The outer edge of this collar catches the lighter separated slag material and channels it inwardly to flow downwardly. The collar also aids in channelling the direction of the flame gases guiding them coaxially outwardly in contact with the exiting slag. The central flame tube 14 is supported on spaced radial struts 21 secured between the base of the tube and the ring 10. The ring, as above stated, is also supported by spaced struts shown 21' which are secured to the inwardly flanged end 9 of the drum 1. The entry portion of the drum is indicated by the double arrowed line 2, and the discharge portion of he drum is indicated by the zone of the double arrowed line 3.

The burner 15 may be provided with a control for increasing or decreasing the flame and the amount of flame gases circulated in through the flame distribution tube 14 in accordance with the material being separated and the quanitity of material being handled. The thin walled flame tube 14 will be heated to the temperature of the gases so that the material being separated will be heated both by contact with the gases and by radiation from the wall of the tube 14.

FIG. 2 provides an arrangement where the discharging flames gases are maintained in contact with the heavier phase of the separated material. In the structure shown therein, 1' presents a rotating centifugal drum. A flame tube 14' is mounted coaxially within the drum with a flame arrangement similar to that shown in FIG. 1 A coaxial ring 10' is positioned at the lower end of the drum to rotate therewith, and has a flared collar at its upper end. The ring 10' provides an annular passage for the flow of separated slag, and the flow of flame gases axially downwardly. Outwardly of the ring 10' is an annular space for the flow of the heavier separated material.

The flame tube 14' amd the ring 10' are supported by circumferentially separated radially outwardly extending hollow spokes 22, 22' and 22". These spokes have upwardly facing openings 23a, 23'a and 23"a, which receive the heavier separated phase flowing downwardly and conduct it outwardly through the discharge openings 23, 23' and 23". The inner ends of these spokes at 22a, 22'a and 22"a are open to the inside of the flame tube 14' so that a certain small amount of the flame gases passing upwardly in the tube can flow laterally outwardly. These bypassed flame gases will blanket the surface of the heavier phase flowing outwardly through the hollow spokes, and will maintain the heat of the separated material and protect its surface to prevent exposure to the air.

We claim as our invention:

1. A mechanism for the centrifugal separation of hot materials such as mixtures of molten metals and slag comprising in combination:

a rotary housing drum having a separation chamber therein with an inlet for receiving material to be separated and with outlets at one end for the flow of separated materials;

means for rotationally driving the drum about an axis of rotation;

rotational support bearings for supporting the drum;

and a flame conducting heater shell within said chamber for heating the material being separated with opening means in the shell for the outlet of hot flame gases into the chamber with said heater shell being mounted to rotate with the drum.

2. A mechanism for the centrifugal separation of hot materials such as mixtures of molten metals and slag comprising in combination:
- a rotary housing drum having a separation chamber therein with an inlet for receiving material to be separated and with outlets at one end for the flow of separated materials;
- means for rotationally driving the drum about an axis of rotation;
- rotational support bearings for supporting the drum;
- a flame conducting heater shell within said chamber for heating the material being separated with opening means in the shell for the outlet of hot flame gases into the chamber;
- and passage means leading from within the heater shell to a conduit for heavier separated material leading from the outlet from the chamber for heavier material.

3. A mechanism for the centrifugal separation of hot materials such as mixtures of molten metals and slag comprising in combination:
- a rotary housing drum having a separation chamber therein with an inlet for receiving material to be separated and with outlets at one end for the flow of separated materials;
- means for rotationally driving the drum about an axis of rotation;
- rotational support bearings for supporting the drum;
- a flame conducting heater shell within said chamber for heating the material being separated with opening means in the shell for the outlet or hot flame gases into the chamber;
- said heater shell projecting coaxially into the chamber and being supported on hollow mounting arms with the interiors of the arms communicating with the interior of the shell and with the outlet for heavier material flowing from the chamber.

4. A mechanism for the centrifugal separation of hot materials such as mixtures of molten metals and slag comprising in combination:
- a rotary housing drum having a separation chamber therein with an inlet at one end for receiving material to be separated and with outlets at the other end for the flow of separated materials;
- a means opposite the inlet for distributing the material entering the inlet circumferentially to be thrown out radially against the wall of the drum;
- means for rotationally driving the drum about an axis of rotation;
- rotational support bearings for supporting the drum;
- and a flame conducting heater shell within said chamber for heating the material being separated with opening means in the shell for the outlet of hot flame gases into the chamber with said heater shell being mounted to rotate with the drum.

5. A mechanism for the centrifugal separation of hot materials such as mixtures of molten metals and slag constructed in accordance with claim 4:
- wherein said distributing means is in the form of a circular wall extending substantially at right angles to the axis of rotation to the drum and positioned so that materials flowing in through the inlet will engage the wall.

6. A mechanism for the centrifugal separation of hot materials such as mixtures of molten metals and slag constructed in accordance with claim 5:
- wherein said wall has an axially extending projection at its center extending toward the inlet so that materials will be distributed by the projection and by the wall.

* * * * *